3,810,896
FLAVONYLOXYALKYL-PIPERAZINE COMPOUNDS

Ernst-Christian Witte, Mannheim, Kurt Stach, Mannheim-Waldhof, Max Thiel, Mannheim, and Androniki Roesch and Egon Roesch, Lampertheim, Germany, assignors to Boehringer Mannheim GmbH, Mannheim-Waldhof, Germany
No Drawing. Filed Apr. 7, 1972, Ser. No. 242,134
Claims priority, application Germany, May 14, 1971, P 21 23 923.6
Int. Cl. C07d 51/70
U.S. Cl. 260—268 BC                11 Claims

ABSTRACT OF THE DISCLOSURE

Certain novel 4-[ω-(flavon-7-yloxy)-alkyl] - piperazine compounds of the formula

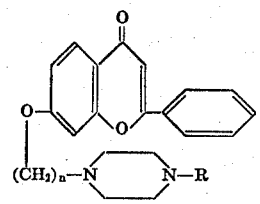

(I)

wherein R is an unsubstituted or substituted phenyl or benzyl radical, the substituents being halogen atoms or lower alkyl or alkoxy radicals, e.g., of from 1 to 6 carbon atoms, and $n$ is 1, 2 or 3; and the pharmacologically compatible salts thereof have outstanding anti-edematous activity and reduce increased capillary permeability.

---

The present invention is concerned with new 4 - [ω-(flavon-7-yloxy) - alkyl] - piperazine derivatives and with the preparation thereof and is also concerned with pharmaceutical compositions containing these new derivatives.

The new 4-[ω-(flavon-7-yloxy)-alkyl] - piperazine derivatives according to the present invention are compounds of the formula:

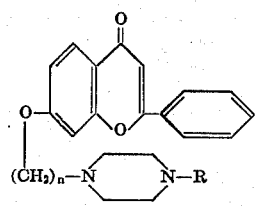

(I)

wherein R is an unsubstituted or substituted phenyl or benzyl radical, the substituents being halogen atoms or lower alkyl or alkoxy radicals, e.g. of from 1 to 6 carbon atoms, and $n$ is 1, 2 or 3; and the pharmacologically compatible salts thereof.

The new Compounds I according to the present invention have an anti-edematous action and reduce increased capillary permeability. They can also suppress the liberation or the action of histamine and serotonin and thus have an anti-inflammatory and anti-allergic action.

The new Compound I according to the present invention can be prepared, for example by one of the following methods:

(a) Condensation of compounds of the general formula:

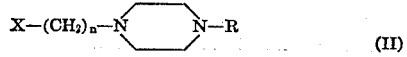

(II)

wherein $n$ and R have the same meanings as above and X is a reactive radical, with 7-hydroxy-flavone; or (b) Condensation of compounds of the general formula:

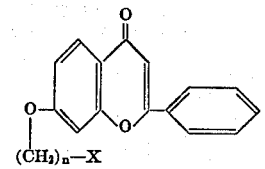

(III)

wherein $n$ and X have the same meanings as above, with compounds of the general formula:

(IV)

wherein R has the same meaning as above; or (c) When R is to be an unsubstituted or substituted benzyl radical, condensation of compounds of the general formula:

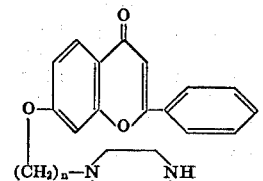

(V)

wherein $n$ has the same meaning as above, with compounds of the general formula X—R, wherein X has the same meaning as above and R is an unsubstituted or substituted benzyl radical; or (d) Condensation of compounds of the general formula:

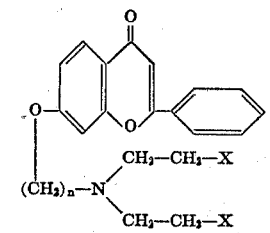

(VI)

wherein $n$ and X have the same meanings as above, with compounds of the general formula:

(VII)

wherein R has the same meaning as above; whereafter the compounds obtained are, if desired, converted into their physiologically compatible salts.

The reactive radical X is the above-given general formula is preferably a halogen atom.

In order to remove the acid HX liberated during the course of the above condensation reactions, it is preferred to carry out the reactions in the presence of an acid-binding agent, for example, an alkali metal or alkaline earth metal carbonate or hydroxide. It is also possible to use one of the reaction components in the form of a salt.

The condensation reactions are preferably carried out in an inert solvent, for example, acetone, methyl ethyl ketone, dimethylformamide, dimethyl sulphoxide, an alcohol or an aromatic hydrocarbon, such as benzene or toluene.

The salts of the new Compound I according to the present invention can be prepared by the reaction of the free bases with physiologically compatible inorganic or organic acids, such as hydrochloric acid, sulphuric acid, phosphoric acid, lactic acid, citric acid or an alkyl-sulphonic acid.

For the preparation of pharmaceutical compositions, the compounds according to the present invention are mixed with solid or liquid pharmaceutical diluents or carriers which, if desired, can also contain odoriferous, flavoring and/or coloring materials. They can be in the form of, for example, tablets or dragées or, with the addition of appropriate adjuvants, can be suspended or dissolved in water or in an oil, for example olive oil.

The following example is given for the purpose of illustrating the present invention

EXAMPLE

Preparation of 1-phenyl-4-[3-(flavon-7-yloxy)-propyl]-piperazine

A mixture of 35.7 g. (0.15 mole) 7-hydroxy-flavone, 22.8 g. (0.165 mole) powdered and dried potassium carbonate and 800 ml. anhydrous methyl ethyl ketone was heated under reflux for 2 hours, while stirring, and then cooled. After the addition of some potassium iodide, 41.6 g. (0.165 mole) 1-phenyl-4-(3-chloropropyl)-piperazine were added thereto dropwise, thereafter rinsed with 300 ml. anhydrous methyl ethyl ketone and then maintained at reflux temperature for 16 hours, while stirring. Subsequently, solid material was filtered off with suction, the filtrate was evaporated in a vacuum and the residue was taken up in chloroform (or in some other solvent which is immiscible with water). The filter cake was dissolved in water and the aqueous phase extracted with chloroform (or with some other solvent which is immiscible with water). The organic phases were now combined and then extracted several times with 1 N aqueous sodium hydroxide solution, washed with water until neutral and dried over anhydrous sodium sulphate, whereafter the solvent was evaporated off in a vacuum. The product remaining behind was recrystallized from isopropanol. There were obtained 35 g. (53% of theory) 1-phenyl-4-[3-(flavon - 7 - yloxy)-propyl]-piperazine, which had a melting point of 151–153° C.

The corresponding hydrochloride, prepared in conventional manner, melted at 258–260° C., after recrystallization from aqueous ethanol.

The following compounds were prepared in an analogous manner.

1-benzyl - 4 - [3 - (flavon-7-yloxy)-propyl]-piperazine from 1-(3-chloropropyl)-4-benzyl-piperazine and 7-hydroxyflavone; yield 87% of theory; M.P. 108–110° C., after recrystalyization from isopropanol; dihydrochloride: M.P. 264–267° C., after recrystallization from aqueous ethanol;

1-(2-chlorobenzyl)-4-[3-(flavon - 7 - yloxy)-propyl]-piperazine from 1-(3-chloropropyl)-4-(2-chlorobenzyl)-piperazine and 7-hydroxyflavone; yield 40% of theory; M.P. 106–107° C., after recrystallization from isopropanol; dihydrochloride: M.P. 251–252° C., after recrystallization from aqueous ethanol;

1-(4-chlorobenzyl) - 4 - [3 - (flavon-7-yloxy)-propyl]-piperazine from 1-(3-chloropropyl)-4-(4-chlorobenzyl)-piperazine and 7-hydroxyflavone; yield 72% of theory; M.P. 94–97° C., after recrystallization from isopropanol; dihydrochloride: M.P. 264–267° C., after recrystallization from aqueous ethanol;

1-(2-methylbenzyl)-4-[3-(flavon - 7 - yloxy)-propyl]-piperazine from 1-(3-chloropropyl)-4-(2-methyl-benzyl)-piperazine and 7-hydroxyflavone; yield 68% of theory; M.P. 113–115° C., after recrystallization from isopropanol; dihydrochloride: M.P. 246–248° C., after recrystallization from aqueous ethanol;

1-(2-methoxybenzyl)-4-[3-(flavon - 7 - yloxy)-propyl]-piperazine from 1-(3-chloropropyl)-4-(2-methoxy-benzyl)-piperazine and 7-hydroxyflavone; yield 41% of theory; dihydrochloride: M.P. 256° C., after recrystallization from aqueous ethanol;

1-(2-chlorobenzyl) - 4 - [2 - (flavon-7-yloxy)-ethyl]-piperazine from 1-(2-chloroethyl)-4-(2-chlorobenzyl)-piperazine and 7-hydroxyflavone; yield 40% of theory; M.P. 106–108° C., after recrystallization from isopropanol; dihydrochloride: M.P. 260–262° C., after recrystallization from aqueous ethanol;

1-(2-chlorophenyl)-4-[3-(flavon - 7 - yloxy)-propyl]-piperazine from 1-(3-chloropropyl)-4-(2-chlorophenyl)-piperazine and 7-hydroxyflavone; yield 63% of theory; hydrochloride: M.P. 242–245° C., after recrystallization from aqueous ethanol.

The new compounds of this invention have anti-edematous activity and reduce increase capillary permeability. They can suppress the liberation, or the activity, of histamine and serotonin and, thus, also have an anti-inflammatory and anti-allergic action.

Benzarone, a substance commercially available under the trademark "Fragivix" [=2-ethyl-3-(4'-hydroxybenz-oyl)-benzofuran], for the treatment of damage to the peripheral capillary vascular wall, was used as a comparison compound.

As the test method there was used the generalized dextran edema of the rat. This method is based on the fact that certain rat strains, upon a single application of dextran (300 mg./kg. i.p.), react in a way similar to anaphylaxis, characterized by itching and the development of edema. An increased discharge of plasma albumin from the blood into the tissue is related to the discharge of water from the blood vessels which results in the formation of edema at the paws, nose, ears, lips, tongue, tail and outer genitals of the animals.

The edemas at the acres can be determined visually on a point scale, the amount of the albumin discharge can be estimated by means of the dye Evans Blue administered intravenously prior to the dextran (0.1 ml./100 g. of a 1.8% Evans Blue solution), since this dye combines with the plasma albumin to form a stable dye-albumin complex. Depending on the quantity of albumin discharge, the edema exhibited a more or less strong blue coloration. The same is also evaluated on a point scale.

The test compounds were injected twice intraperitoneally, either as a solution in physiologically pure sodium chloride solution or as a suspension in 1% methyl cellulose (with the exception of Benzarone which was administered in 0.5% methyl cellulose with addition of 0.4% of Cremophor EL), one hour before and 30 minutes after the administration of Evans Blue and dextran. Their effectiveness was detectable by the inhibition of edema and color discharge in a group of ten male rats treated with the test compound relative to a control group of ten male rats treated only with Evans Blue and dextran (i.p. the solvent only; 1 ml./100 g.).

The difference between the results in these two groups, as evidenced by inhibition of edemas and the color discharge (expressed as percent inhibition) is set forth in the table below.

TABLE.—ACTION ON THE GENERALIZED DEXTRAN EDEMA (ANAPHYLACTOID REACTIONS) IN RATS
[All percentages are relative to the untreated control animals ($p<0.05$)]

| Test compound | Dosage, mg./kg. | Edemas percent inhibition | Color discharge, percent inhibition |
|---|---|---|---|
| 1-benzyl-4-[3-(flavon-7-yl-oxy)-propyl]-piperazine | 25 | 35 | 30 |
| 1-(2-methyl-benzyl)-4-[3-(flavon-7-yl-oxy)-propyl]-piperazine | 3 | 36 | 23 |
| 1-(2-methoxybenzyl)-4-[3-(flavon-7-yl-oxy)-propyl]-piperazine | 12 | 25 | 29 |
| 1-(2-chlorobenzyl)-4-[2-(flavon-7-ly-oxy)-ethyl]-piperazine | 12 | 42 | 43 |
| 1-(2-chlorobenzyl)-4-[3-(flavon-7-yl-oxy)-propyl]-piperazine | 3 | 40 | 32 |
| 1-(4-chlorobenzyl)-4-[3-(flavon-7-yl-oxy)-propyl]-piperazine | 6 | 65 | 50 |
| 1-phenyl-4-[3-flavon-7-yl-oxy)-propyl]-piperazine | 12 | 61 | 55 |
| Benzarone | 37.5 | 15 | 36 |
|  | 75 | 57 |  |

It can be seen from the above table that the new compounds are substantially more effective than Benzarone, even when used at lower dosages than those used for the standard comparison material.

With respect to the proper dosage and methods of application for the instant compound, these are comparable to those for the commercially known compound "Fragivix," which has been described in connection with the comparative tests set forth in the table above. The instant compounds make possible comprehensive therapy of acute as well as chronic phlebological and capillary afflictions as well as varicose syndromes. The instant compounds retard reactions leading to edemas and swellings, including those of allergic origin.

The typical daily dosage of 10 to 300 mg. results in reducing or eliminating the above afflictions, commonly within some days. A preferred dosage is 30–100 mg.

It will be understood that the specification and examples are illustrative but not limitative of the present invention and that other embodiments within the spirit and scope of the invention will suggest themselves to those skilled in the art.

What is claimed is:

1. 4-[w-(flavon-7-yloxy) - alkyl]-piperazine compound of the formula

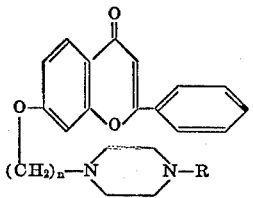

wherein
R is phenyl, benzyl, substituted phenyl or substituted benzyl wherein the substituent is one to three halogen or lower alkyl or alkoxy of from one to six carbon atoms, and
$n$ is an integer from 1 to 3 inclusive;
and the pharmacologically acceptable salts thereof.

2. Compound as claimed in claim 1 wherein R is phenyl.
3. Compound as claimed in claim 1 wherein R is benzyl.
4. Compound as claimed in claim 1 wherein R is substituted phenyl and the substituent is at least one of chlorine, bromine or iodine or lower alkyl or alkoxy of from one to six carbon atoms.
5. Compound as claimed in claim 1 wherein R is substituted benzyl and the substituent is at least one of chlorine, bromine or iodine or lower alkyl or alkoxy of from one to six carbon atoms.
6. Compound as claimed in claim 1 wherein $n$ is 1.
7. Compound as claimed in claim 1 wherein $n$ is 2.
8. Compound as claimed in claim 1 wherein $n$ is 3.
9. Compound as claimed in claim 1 designated 1-(2-methylbenzyl) - 4 - [3-(flavon-7-yl-oxy)-propyl]-piperazine.
10. Compound as claimed in claim 1 designated 1-(2-chlorbenzyl)-4-[3-(flavon-7-yl-oxy)-propyl]-piperazine.
11. Compound as claimed in claim 1 designated 1-(4-chlorbenzyl)-4-[3-(flavon-7-yl-oxy)-propyl]-piperazine.

References Cited
UNITED STATES PATENTS

| | | | |
|---|---|---|---|
| 3,079,402 | 2/1963 | Voigt | 260—345.2 |
| 3,098,854 | 7/1963 | Klosa | 260—345.2 |
| 3,352,754 | 11/1967 | Gazave | 260—345.2 |
| 3,410,851 | 11/1968 | Stauffer | 260—268 BC |
| 3,433,805 | 3/1969 | Krämer et al. | 260—345.2 |
| 3,462,458 | 8/1969 | Krämer | 260—345.2 |
| 3,471,520 | 10/1969 | Irmscher | 260—268 BC |

DONALD G. DAUS, Primary Examiner

U.S. Cl. X.R.

260—268 R, 345.2; 424—250